April 19, 1938.  C. V. AGGERS  2,114,827

BATTERY CHARGING REGULATOR

Filed Sept. 26, 1935

WITNESSES:
C. J. Weller.
C. F. Bryant.

INVENTOR
Clair V. Aggers.
BY
Ezra W. Savage
ATTORNEY

Patented Apr. 19, 1938

2,114,827

UNITED STATES PATENT OFFICE 2,114,827

BATTERY CHARGING REGULATOR

Clair V. Aggers, Forest Hills, Pa., assignor to Westinghouse Electric & Manufacturing Company, East Pittsburgh, Pa., a corporation of Pennsylvania Application September 26, 1935, Serial No. 42,169

12 Claims. (Cl. 171—314)

My invention relates to automatically controlled battery charging and other equivalent direct-current supply systems and it has particular relation to improvements in systems of the type in which the charging or output current is supplied through a rectifier from an alternating-current source of power.

Generally stated, the object of my invention is to closely approximate uniformly constant voltage at the terminals of the battery or in the consumption circuit which the system supplies.

One object is to provide means whereby the currents supplied through a system of the above-described class will be unaffected by fluctuations in the voltage of the alternating-current supply circuit.

Another object is to provide a system capable of compensating for changes in the degree of charge of the storage battery and in the magnitude of the load which the system supplies.

A further object is to provide a system wherein changes in the voltage drop through the impedance of the rectifier do not substantially alter the magnitude of battery charging current.

A still further object is to provide a regulating system possessed of the above particularized features in which all of the equipment utilized is of the static or non-moving part variety.

Additional objects and advantages of my invention will best be understood through the following description of a specific embodiment thereof, when taken in conjunction with the accompanying drawing, in which.

Figure 1:
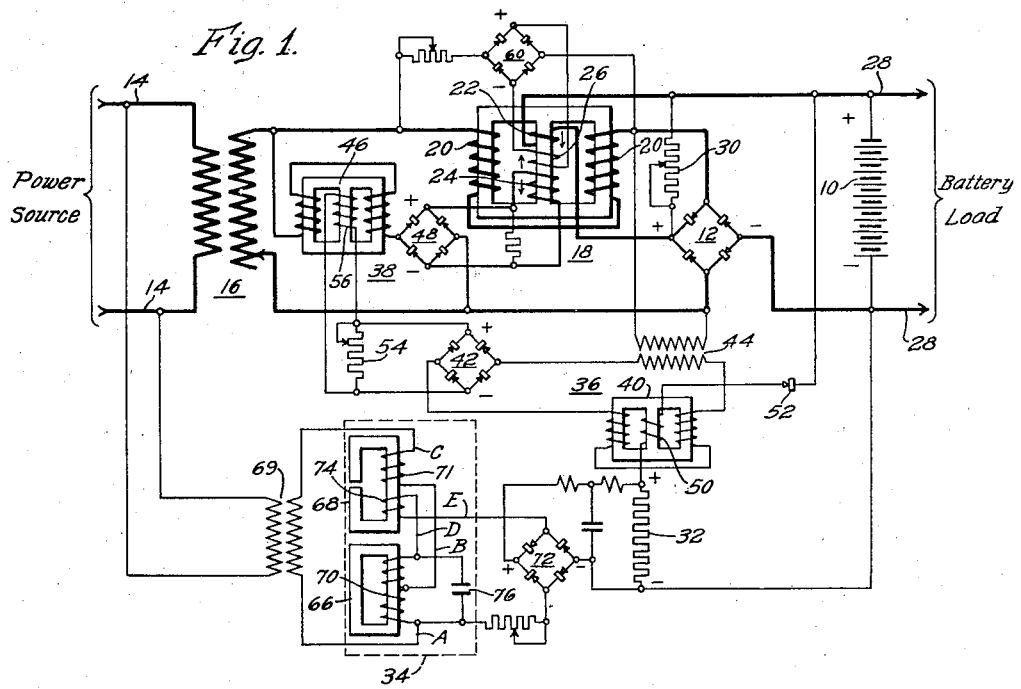
Figure 1 is a diagrammatic representation of apparatus and circuits comprising but one preferred form of the regulating system of my invention.

Referring to the drawing, the regulating system depicted in Fig. 1 is shown as being adapted to automatically control, in accordance with optimum considerations later to be explained, the charging current supplied to a storage battery 10 through a full-wave rectifier 12, of the copper-oxide disc or other suitable type, from an alternating-current power circuit 14. To adjust the magnitude of this current, a saturable-core reactor 18 is connected intermediate the rectifier and its supply transformer 16.

In the illustrated connection, the circuit through which the battery-charging or other output current is supplied includes the windings 20 carried on the two outer legs of the reactor core structure. The central leg of this structure carries a plurality of windings, indicated at 22, 24 and 26, which jointly control the degree of magnetic saturation of the core to thereby determine the effective impedance presented to the flow of current by the before-mentioned windings 20.

In order that changes in the state of charge of the battery 10 and in the magnitude of the load current which it supplies to the consumption circuit 28 may alter the charging current in a manner tending to maintain constant the battery voltage, I energize the saturation control winding 22 by a measure of the charging current supplied to the battery. When the battery voltage drops, either because of an increase in load drawn by the consumption circuit or due to a relatively low state of charge, the resulting tendency for the charging current to increase is amplified by the increased degree of core saturation which the winding 22 imparts to the reactor. The resulting lowered reactor impedance further raises the charging current to thereby cause the battery voltage to more closely approach the value which it is desired that the charging system maintain.

Another beneficial effect of the described arrangement is that it also compensates for changes in the voltage drop through the impedance of the rectifier 12. In rectifiers of the copper-oxide disc type, which are now so extensively used in charging systems of the subject class, this impedance tends to increase with use, and to take account of this ageing effect, I further connect in shunt circuit relation with the saturation control winding 22 of the main reactor 18 an adjustable resistor or rheostat 30, the setting of which may from time to time be changed to restore the proper relation between the rectifier impedance and the saturating effect of winding 22.

For the purpose of enabling my improved charging system to maintain uniform voltage at the battery 10 even when that of the supply circuit 14 widely fluctuates, I provide means for energizing the saturation control winding 24 of the reactor 18 by a current which is determined by the difference between the battery voltage and that appearing across a reference potential resistor 32, upon which is impressed, by means of an apparatus 34 to be more completely described, a unidirectional voltage of substantially constant magnitude. In the interests of making this portion of the charging-current control system more sensitive, I amplify this voltage difference, preferably through the use of a plurality of stages of magnetic amplifying apparatus generally indicated at 36 and 38.

The first represented stage 36 includes a saturable core reactor 40 which determines the current supplied to a rectifier 42 from a transformer 44 energized by the voltage impressed upon the main charging-current rectifier 12. The second stage 38 likewise includes a saturable core reactor 46 which determines the amount of current supplied to the before-mentioned control winding 24 of the main reactor 18 through a rectifier 48 energized from the main power source transformer 16.

Normally, the voltage across reference potential resistor 32 slightly exceeds that of the battery 10, and thereby causes to flow in the control winding 50 of the reactor 40 a current which directly varies with the magnitude of this difference. For the purpose of preventing current flow should the battery voltage exceed that of the reference resistor a rectifier 52 may, if desired, be included in the illustrated circuit by means of which the battery and the reference resistor 32 are connected in polarity opposition through this control winding.

In operation, as the battery voltage drops, reactor 40 becomes more saturated, and passes through rectifier 42 more current which causes resistor 54 to impress a higher potential on the control winding 56 of reactor 46. The resulting lowered impedance of this reactor raises the magnitude of current supplied to saturation control winding 24 of the main reactor 18, and thereby causes the reactor to appropriately increase the charging current. As the battery voltage rises and more nearly approaches that of the reference resistor 32, the saturation of reactors 40 and 46 is correspondingly reduced with the result that winding 24 tends to cause the main reactor 18 to reduce the battery charging current.

Figure 3:
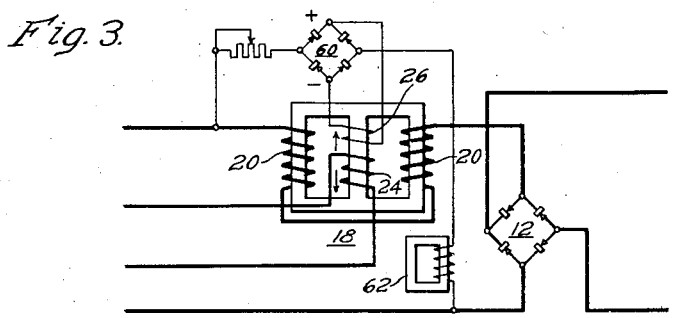
Fig. 3 is a diagrammatic representation of a portion of the system of Fig. 1 showing certain variations in the circuits comprised thereby.

To further assist the control arrangement last described in compensating for changes in the voltage of power supply circuit 14 and to render the arrangement more sensitive, I provide means whereby the third saturation control winding 26 of the main reactor 18 may be energized by a current determined either by the voltage drop across the reactor windings 20, as shown in Fig. 1, or by a measure of the secondary voltage of the main power supply transformer 16, as shown in Fig. 3. In both instances, the winding 26 is connected with the output terminals of a rectifier 60. In the arrangement of Fig. 1, this rectifier has impressed upon it a measure of the voltage appearing across the before-mentioned windings 20 of the main rectifier 18. In the arrangement of Fig. 3, the rectifier is energized by a measure of the power source voltage through a circuit which includes a special reactor 62 designed to so saturate as to substantially amplify the power source voltage changes.

This saturation control winding 26 is arranged to magnetically oppose the before-mentioned winding 24 to thereby reduce the effect of the uncontrolled component of current flow therethrough. As a result, increases in the power source voltage tend to neutralize the effect of winding 24 which otherwise would impart to the main reactor 18 an excessive degree of saturation. With the arrangement described, however, changes in the power-source voltage are effective to recalibrate the control means, including winding 24 and the reference potential resistor 32, in a manner to allow the complete system to more properly and more sensitively function.

This last described combination of saturation control influences cooperates with the first-named control winding 22 to effect the desired constancy of voltage maintenance across the battery 10. Inasmuch as it is desired that a decrease in the battery voltage, whether due to elevated loading, low state of charge, or low rate of charging current, increase the rate of the charging current to thereby correctively raise the terminal voltage, the charging current responsive winding 22 of the current adjusting reactor 18 is arranged to aid or act cumulatively with the battery voltage responsive winding 24. The resulting cooperation, in conjunction with the power source voltage change-responsive winding 26, is to maintain the battery voltage within much closer limits than has been possible with charging current regulating systems heretofore known. In practice, limits as close as one-half of 1% are readily made possible by my improved system.

One aspect of this system provides a static regulator for maintaining a reference potential. This may take the form of the static regulator 34, through which the voltage of power circuit 16 is caused to impress upon the reference resistor 32 a potential which may either be maintained constant for variations in the power source voltage or may be made to change in a predetermined manner as this voltage changes.

Preferably, this equipment 34 comprises a pair of core structures 66 and 68 which are designed to operate at different degrees of magnetic saturation, structure 66 being highly saturated, and structure 68 being relatively unsaturated. The voltage A—C of the circuit 16 is impressed, in the connection shown, through a transformer 69 upon a pair of series connected windings 70 and 71 respectively carried by the two named structures. In this core exciting connection only the lower portion of winding 70 is active. The output voltage A—E is impressed upon a rectifier 72, to the output terminals of which the before-referred-to reference resistor 32 is connected. This voltage is made up of the voltage appearing across the entire length of winding 70 and that of an opposition connected winding 74. A capacitor 76 connected in parallel circuit relation with the winding 70 functions to further shift the phase of the currents supplied to the exciting windings of the two cores.

Figure 2:
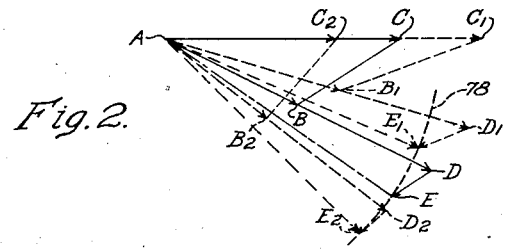
Fig. 2 is a diagram of voltage vectors illustrating the manner of operation of the reference voltage supply equipment comprised by the system of Fig. 1.

The manner in which the equipment 34 operates is illustrated by the vector diagram of Fig. 2. At an intermediate value of supply voltage A—C, the potential appearing across the lower portion of the saturated-core carried winding 70 is represented by vector A—B, and that appearing across the winding 71 of the unsaturated core by vector B—C. The potential induced in the upper portion of winding 70 is represented by vector B—D, while that induced in winding 74 is shown by vector D—E. The output voltage (impressed upon rectifier 72) A—E is the vector sum of voltages A—D and D—E and falls upon the arc of a circle 78.

As the supply voltage is increased to A—C₁, for example, its division between the two core structure windings changes to that shown by vectors A—B₁ and B₁—C₁. The output voltage A—E₁ is then determined by the two vectors A—D₁ and D₁—E₁. While somewhat shifted in phase position, the magnitude remains unchanged, the end of vector D₁—E₁ falling upon the circle arc 78. In a similar manner, as the supply voltage decreases to A—C₂, the output voltage impressed upon the rectifier 72 is given by the vector A—E₂, which is still of the same magnitude though shifted in phase position in the opposite direction.

The above assumed constant magnitude relation is, of course, available when the electrical constants of all of the different elements comprised by the equipment 34 are properly correlated, which correlation, in practice, is readily obtained. By changing this correlation, however, the output voltage of the equipment may be either made to rise or fall as the supply voltage increases or decreases, and thus still further broadens the compensating possibilities of the before-described battery charging system.

In situations in which the frequency of the supply circuit voltage is subject to substantial variations it may be desirable to omit from equipment 34 the capacitor 76 in order that these variations will not affect the equipment output potential. Such an omission can be compensated for by making certain other portions of the equipment circuits of more substantial electrical dimensions.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In a system comprising an output circuit adapted to be connected to a storage battery or other direct-current load, an input circuit adapted to be connected to an alternating-current source of power, and rectifier means for supplying to the output circuit a unidirectional current, the combination of a saturable-core reactor connected intermediate the input circuit and the rectifier means, means for controlling the degree of saturation of said reactor core to thereby adjust the reactor impedance comprising a plurality of saturating windings, a source of reference potential, and means sensitive to changes in the difference between the voltage of the output circuit and that of said reference source for controlling the degree of energization of one of said windings.

2. In a system comprising an output circuit adapted to be connected to a storage battery or other direct-current load, an input circuit adapted to be connected to an alternating-current source of power, and a rectifier for supplying to the output circuit a unidirectional current, the combination of a saturable-core reactor connected intermediate the input circuit and the rectifier, means comprising a plurality of windings for saturating the reactor core to thereby adjust the reactor impedance, separately controlled means for supplying energizing currents to said several windings, a source of reference potential, and means sensitive to changes in the difference between the voltage of the output circuit and that of said reference source for controlling one of said energizing currents.

3. In a system comprising an output circuit adapted to be connected to a storage battery or other direct-current load, an input circuit adapted to be connected to an alternating-current source of power, and a rectifier for supplying to the output circuit a unidirectional current, the combination of a saturable-core reactor connected intermediate the input circuit and the rectifier, means for saturating said reactor core to thereby adjust the reactor impedance, means comprising a second reactor having a core-saturating winding, for controlling the saturation of said first-named reactor, a source of reference potential, and a circuit for circulating through the saturating winding of said second-named reactor a current determined by the difference between the voltage of the output circuit and that of said reference source.

4. In a system for supplying a unidirectional current to a load circuit comprising current-adjusting means, the combination of control means therefor comprising a reactor having a core-saturating winding, a source of reference potential, a circuit for circulating through said winding a current determined by the difference between the voltage of the load circuit and that of said reference source, and a rectifier so included in said circuit as to permit current flow only when the load-circuit voltage is less than the reference-source voltage.

5. In a system comprising an output circuit adapted to be connected to a storage battery or other direct-current load, an input circuit adapted to be connected to an alternating-current source of power, and a rectifier for supplying to the output circuit a unidirectional current, the combination of charging-current adjusting means having a control winding sensitive to changes in current passage therethrough, means, comprising a pair of magnetic-core structures carrying windings interconnected for energization by a measure of the voltage of said power source, for producing a reference potential of substantially constant magnitude, and a circuit for circulating through said adjusting-means control winding a current determined by the difference between the voltage of the output circuit and that of said reference source.

6. In a system for supplying charging current to a storage battery from an alternating-current power source through a rectifier, the combination of charging-current-control means comprising a reactor having a core-saturating winding, means, comprising a pair of magnetic-core structures carrying windings interconnected for energization by a measure of the voltage of said power source, for producing a reference potential of substantially constant magnitude, and a circuit for circulating through the core-saturating winding of said reactor a current determined by the difference between the voltage of the battery and the said reference potential.

7. In a system interconnecting input and output circuits comprising rectifier means supplying unidirectional current to said output circuit from alternating-current in said input circuit, the combination with a reactor connected between the rectifier and the input circuit and having a core-saturating winding associated therewith of means for supplying an energizing current to said winding, means, comprising a pair of magnetic core structures carrying windings interconnected for energization by a measure of the voltage of said input circuit, for producing a reference potential of substantially constant magnitude, and means for controlling the said winding current in accordance with the difference between the output-circuit voltage and the said reference potential.

8. In a system comprising an output circuit adapted to be connected to a storage battery or other direct-current load, an input circuit adapted to be connected to an alternating-current source of power and a rectifier for supplying a unidirectional current to the output circuit, the combination of a saturable-core reactor connected intermediate the input circuit and the rectifier, means, comprising a pair of windings, for saturating the reactor core to thereby adjust the reactor impedance, means for energizing one of said windings by a measure of the said unidirectional current, means for supplying an energizing current to the other of said windings, and means sensitive to changes in the voltage of said output circuit for controlling the magnitude of said last-named current.

9. In a system comprising an output circuit adapted to be connected to a storage battery or other direct-current load, an input circuit adapted to be connected to an alternating-current source of power and a rectifier for supplying a unidirectional current to the output circuit, the combination of a saturable-core reactor connected intermediate the input circuit and the rectifier, means, comprising a pair of windings, for saturating the reactor core to thereby adjust the reactor impedance, means for supplying energizing currents to said windings, means sensitive to changes in the voltage of said output circuit for controlling the magnitude of one of said currents, and means sensitive to changes in the voltage of said input circuit for controlling the magnitude of the other of said currents.

10. In a system interconnecting input and output circuits comprising rectifier means supplying unidirectional current to said output circuit from alternating-current in said input circuit, the combination with a saturable-core reactor connected intermediate the input circuit and the rectifier means of means, comprising a pair of windings for saturating the reactor core to thereby adjust the reactor impedance, means for supplying energizing currents to said windings, means sensitive to changes in the voltage of said output circuit for controlling the magnitude of one of said currents, and means sensitive to changes in the voltage of said input circuit for controlling the magnitude of the other of said currents, the magnetizing effects of said two windings being in opposition.

11. In a system comprising an output circuit adapted to be connected to a storage battery or other direct-current load, an input circuit adapted to be connected to an alternating-current source of power and a rectifier for supplying a unidirectional current to the output circuit, the combination of a saturable-core reactor connected intermediate the input circuit and the rectifier, means, comprising three windings, for saturating the reactor core to thereby adjust the reactor impedance, means for energizing one of said windings by a measure of the said unidirectional current, means for supplying energizing currents to the remaining two of said windings, means sensitive to changes in the voltage of said output circuit for controlling the magnitude of one of said currents, and means sensitive to changes in the voltage of said input circuit for controlling the magnitude of the other of said circuits.

12. In a system interconnecting input and output circuits comprising rectifier means supplying unidirectional current to said output circuit from alternating-current in said input circuit, the combination of a saturable-core reactor connected intermediate the input circuit and the rectifier means, means, comprising a pair of windings, for saturating the reactor core to thereby adjust the reactor impedance, means for supplying energizing currents to said windings, means sensitive to changes in the voltage of said output circuit for controlling the magnitude of one of said currents, and means sensitive to changes in the voltage drop across said reactor for controlling the magnitude of the other of said currents.

CLAIR V. AGGERS.